Patented Sept. 8, 1942

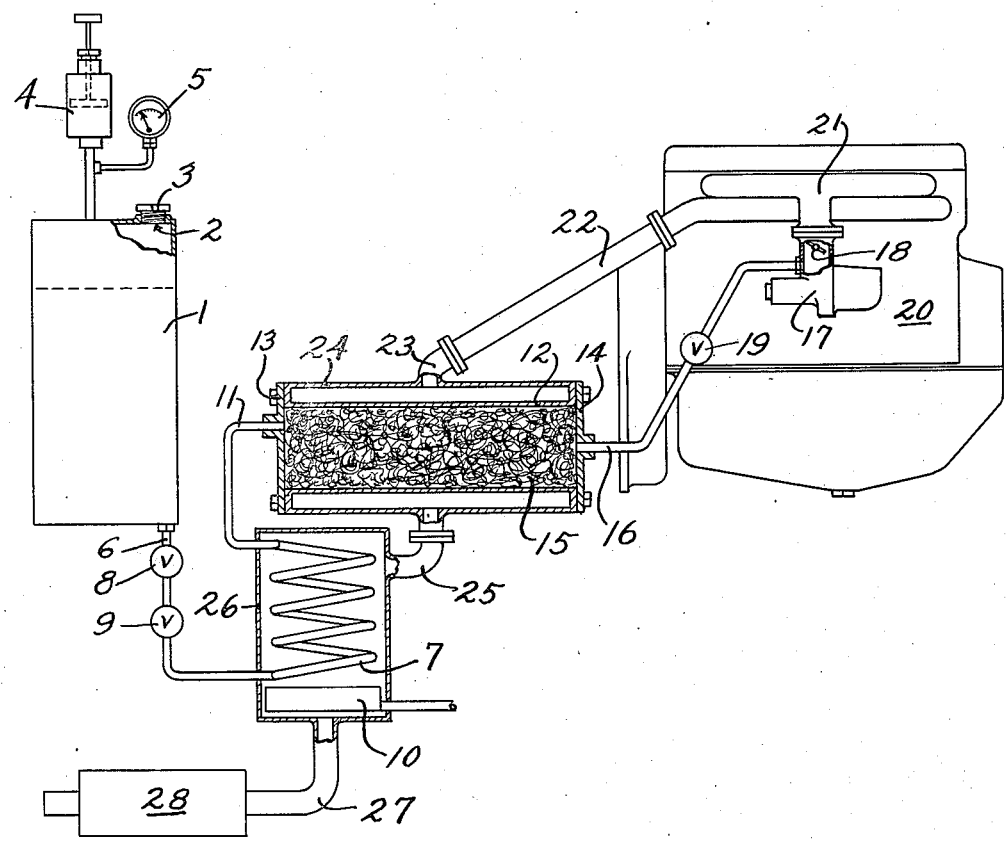

2,295,209

UNITED STATES PATENT OFFICE 2,295,209

FUEL FOR INTERNAL COMBUSTION ENGINES

Paul A. Guiles and Basil Rawes Vaughan,
San Francisco, Calif.

Application December 27, 1939, Serial No. 311,152

2 Claims. (Cl. 123—3)

The present invention relates to improvements in fuels for internal combustion engines, and its principal object is to provide a method of and means for rendering water available as such a fuel.

More particularly it is proposed to use a bed of steel wool or other oxidizing agent for decomposing water which has been turned into steam and for setting free hydrogen to be used as fuel for the engine.

It is further proposed to provide a convenient and simple apparatus whereby water is first heated to produce steam and the steam is passed through an enclosed body of steel wool for liberating the hydrogen, which is delivered to the engine, in the presence of atmospheric air or another suitable combustion supporter, while the exhaust gases from the engine are used to supply heat to the steel wool and the heater so that the entire apparatus may be run without the aid of an external source of heat except for the initial stage.

Further objects and advantages of our invention will appear as the specification proceeds and the novel features thereof will be fully set forth in the claims hereto appended.

The preferred form of our invention is illustrated in the accompanying drawing, in which the invention is shown diagrammatically.

While we have shown only the preferred form of our invention, we wish to have it understood that various changes or modifications may be made within the scope of the claims hereto attached without departing from the spirit of the invention.

Referring to the drawing in detail, our invention comprises, in its preferred form, a vessel 1 for holding water which may be filled to a suitable height through an opening 2 adapted to be closed by a cap 3. Suitable pressure may be produced in the tank through a pump 4 and may be measured through a gauge 5. While we do not wish to confine ourselves to a definite degree of pressure, the same should be sufficient to force the water and steam subsequently created through the system and we find in actual practice that three or four pounds are ordinarily sufficient for our purposes.

A pipe 6 connecting with the bottom of the vessel leads to a heating coil 7 and may be controlled through a shut-off valve 8 and a needle valve 9. Any suitable means such as a burner 10 or electrical heating means may be used for initially heating the coil and for turning the water passing there-through into steam.

The coil 7 connects, through a pipe 11, with a container 12, which is preferably made in the form of an elongated tube, and which is provided with movable end plates 13 and 14. This container is made to receive a body of steel wool, indicated at 15, and the steam is made to pass through the same from end to end.

An outlet pipe 16 connects the end opposite the point of entry with a conventional type of carburetor, indicated at 17, preferably immediately below the throttle valve 18 thereof. The carburetor may be of any suitable construction. The pipe 16 is controlled by a suitable valve 19.

The carburetor is connected to the engine 20 in the conventional manner. The engine may be of any suitable type and, if desired, the carburetor may be connected, in any conventional manner, to a suitable gasoline fuel supply so as to be capable of operation by gasoline, particularly for starting purposes.

The intake manifold of the engine is indicated at 21 and the exhaust of the engine at 22. The exhaust gases of the engine are preferably utilized for providing the necessary heat for the body of steel wool and the coil. To accomplish this the gases constituting the products of combustion, are guided through pipe 23, into a jacket 24, surrounding the steel wool chamber and, after having passed through the jacket, are guided through a pipe 25 into a housing 26 surrounding the heating coil 7 to be finally ejected through the pipe 27 and the muffler 28.

In operation the water from the container 1 passes to the coil 7 where it is converted into steam, and the latter passes into and through the body of steel wool 15. The latter oxidizes in the presence of the steam, and takes oxygen from the latter, thereby freeing the hydrogen contained therein. The hydrogen passes through the pipe 16 into the carburetor below the throttle valve and joins with air entering through the carburetor to form a fuel for the engine.

For initial heating, the engine may be started on an auxiliary supply of gasoline in the conventional manner, until the exhaust gases have heated the body of steel wool and the coil sufficiently to convert the water into steam, whereupon the operation may be switched over to the water tank in the manner previously described.

If it is not desired to carry an auxiliary supply of gasoline, for starting purposes, special heaters or burners of any kind, may be relied on to furnish the initial heat for the steel wool and the coil.

It is apparent that other materials may be substituted for the steel wool, such as iron filings, scrap iron or other oxidizing agents, which will take up oxygen from the passing steam and will liberate hydrogen. We find that after a certain amount of use the steel wool becomes heavily oxidized and has to be renewed.

The coil 7 is merely shown as one suitable means for converting the water into steam, and any other suitable means may be substituted for the same. During normal operation, the exhaust gases arranged to pass in heat-exchange relation with the steel wool and the coil are sufficient to furnish the necessary heat required.

The engine may be of any suitable kind. We have carried on our experimental work with a conventional automobile engine of the internal combustion type, using a spark for exploding the mixture within the combustion chamber.

We claim:

1. A fuel feeding apparatus for an internal combustion engine, comprising a tank for holding water, and having means for placing the water under pressure, a closed conduit connecting the tank and the engine intake, a coil in the conduit for receiving water from the tank, means for heating the coil whereby the water is turned into steam, a container for steel wool in the conduit and mounted to receive steam from the coil outlet and to discharge into the engine intake, means for heating the container whereby the steam passing over the steel wool is reduced in part for producing free hydrogen and whereby mixed steam and free hydrogen is fed to engine intake, and means for adding air to the mixture after it leaves the container.

2. A fuel feeding apparatus for an internal combustion engine, comprising a coil, means for forcing water therethrough under pressure, means for heating the coil whereby the water is turned into steam, a container for steel wool having connections to receive steam from the coil outlet and to discharge into the engine intake, means for heating the container whereby the steam passing over the steel wool is reduced in part for producing free hydrogen and whereby mixed steam and free hydrogen is fed to the engine intake, and means for adding air to the mixture after it leaves the container, the water feeding means, the coil and the steel wool container with their connections forming a closed conduit whereby all the water fed into the conduit is made to pass through the same.

PAUL A. GUILES.
BASIL RAWES VAUGHAN.